Figure 3:
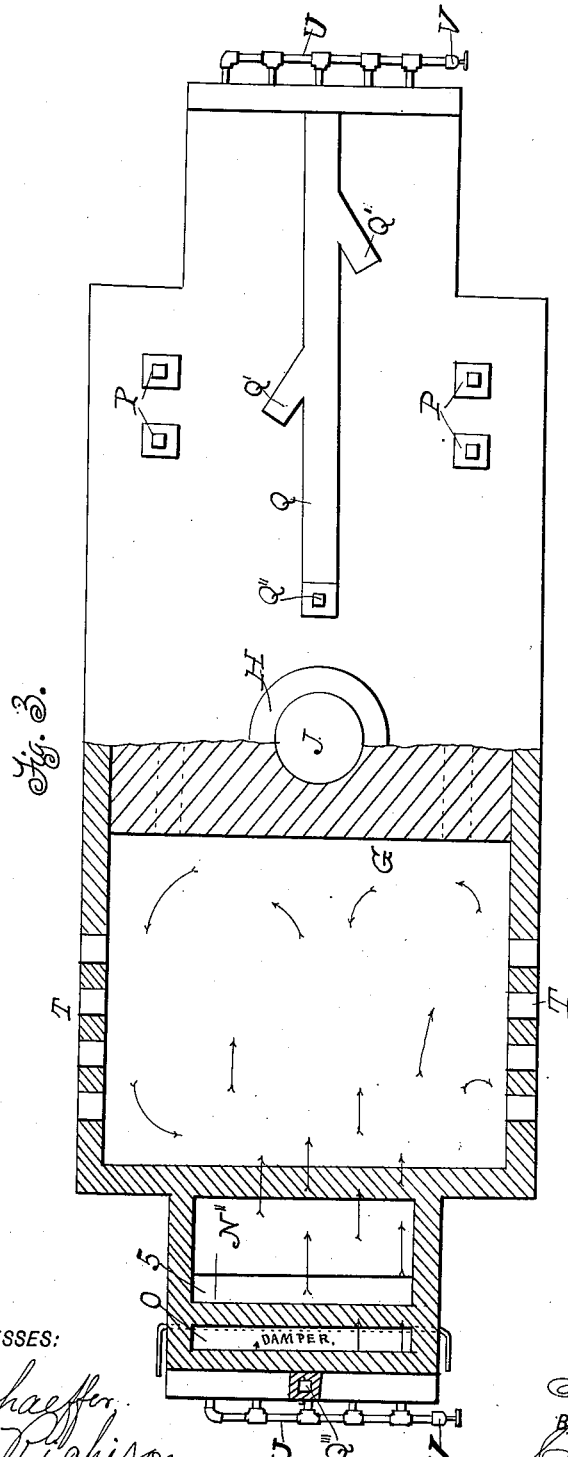

(No Model.)   3 Sheets—Sheet 1.
T. P. KENNEY.
GLASS MELTING TANK.
No. 545,630.   Patented Sept. 3, 1895.
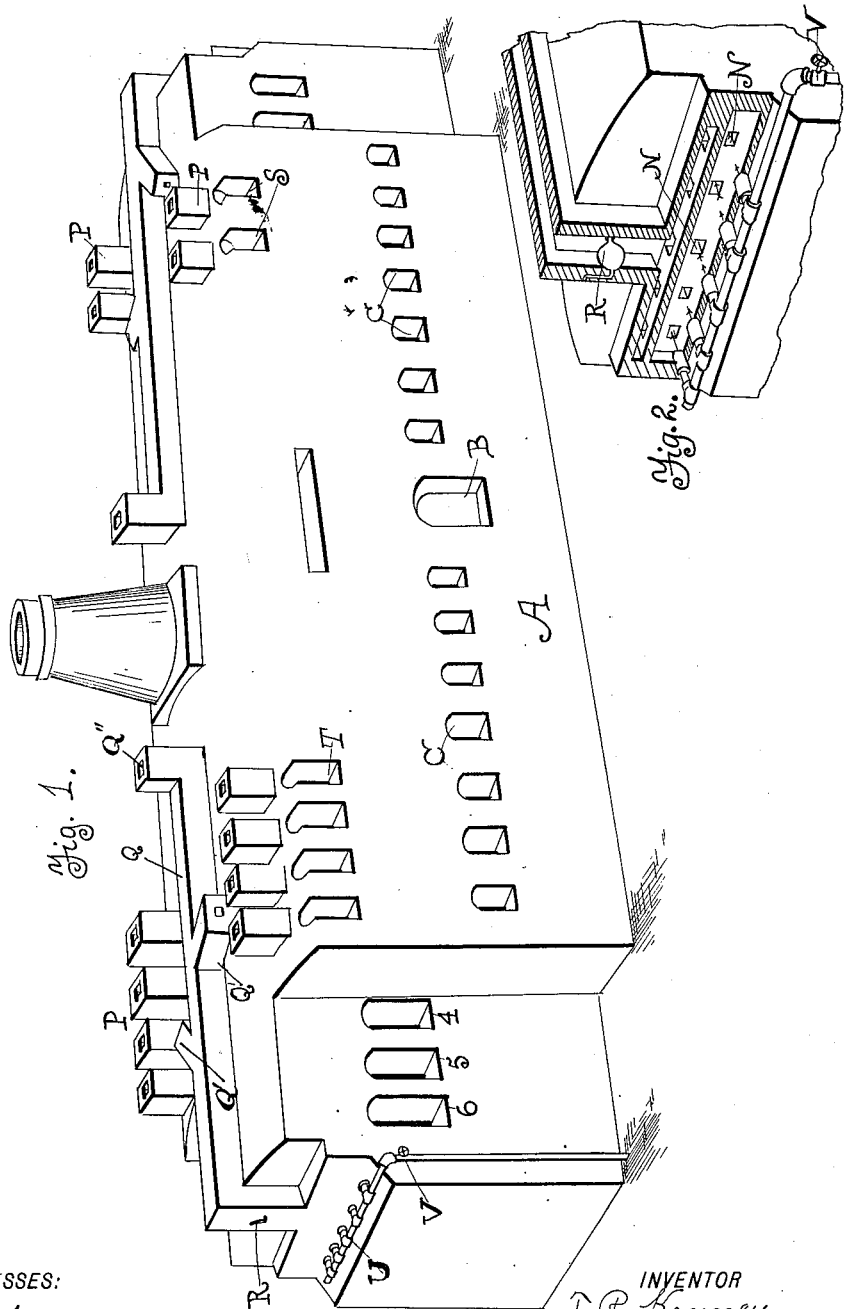
WITNESSES:
INVENTOR
T. P. Kenney
BY
Chas. E. Adamson
ATTORNEY.

(No Model.) 3 Sheets—Sheet 2.

T. P. KENNEY.
GLASS MELTING TANK.

No. 545,630. Patented Sept. 3, 1895.

WITNESSES:
L. Schaeffer
W. A. Richison

INVENTOR
T. P. Kenney
BY
Chas. E. Adamson
ATTORNEY.

(No Model.)
T. P. KENNEY.
GLASS MELTING TANK.
No. 545,630. Patented Sept. 3, 1895.
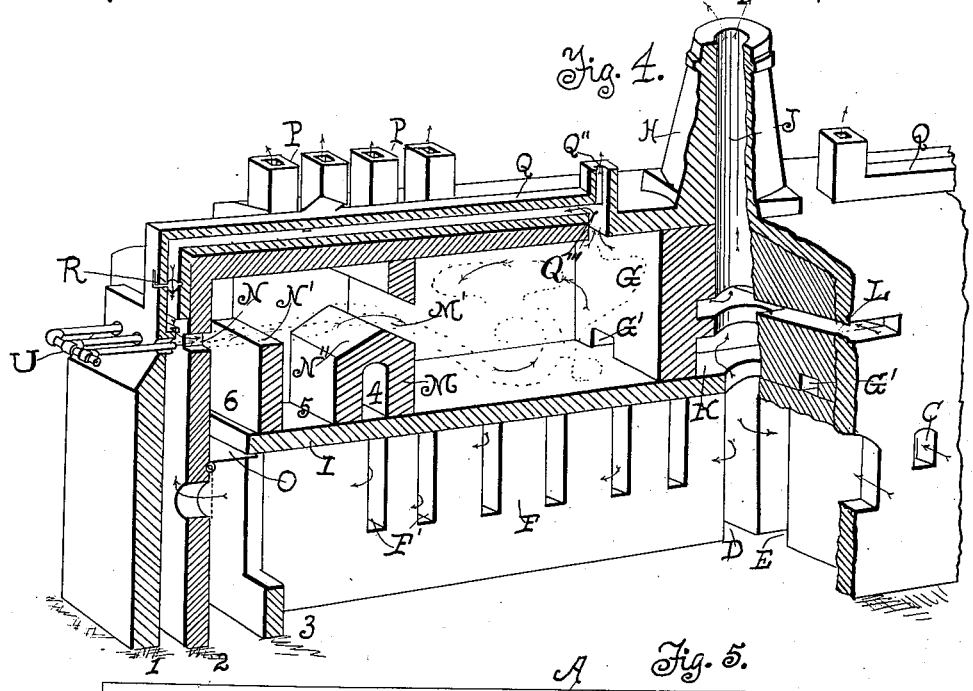
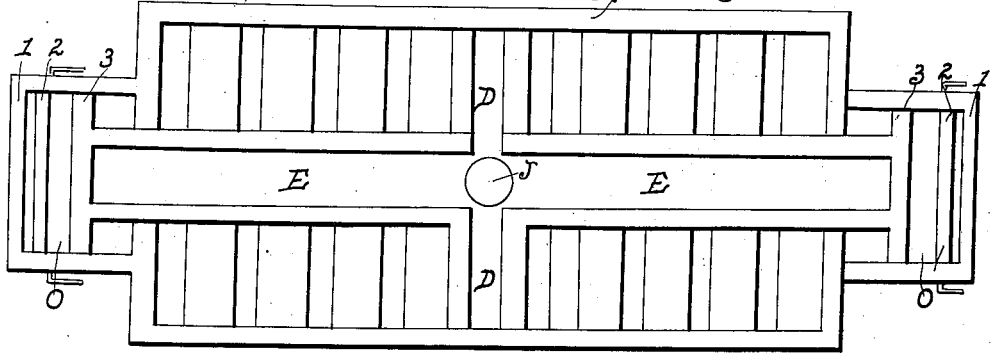
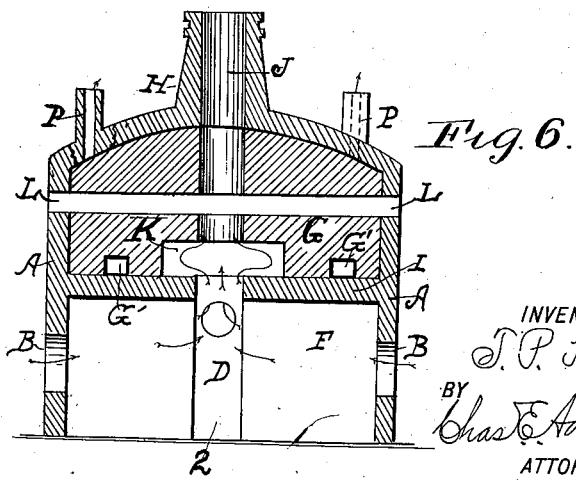
WITNESSES:
L. Schaeffer
W. A. Richison
INVENTOR
T. P. Kenney
BY Chas. E. Adamson
ATTORNEY.

UNITED STATES PATENT OFFICE.

THOMAS PATRICK KENNEY, OF HARTFORD CITY, INDIANA.

GLASS-MELTING TANK.

SPECIFICATION forming part of Letters Patent No. 545,630, dated September 3, 1895.

Application filed March 20, 1894. Serial No. 504,388. (No model.)

*To all whom it may concern:*

Be it known that I, THOMAS PATRICK KENNEY, a citizen of the United States, residing at Hartford City, in the county of Blackford and State of Indiana, have invented certain new and useful Improvements in Glass-Melting Tanks; and I do hereby declare the following to be a full, clear, and exact description of the invention, such as will enable others skilled in the art to which it appertains to make and use the same.

My invention relates to improvements in tanks for melting glass; and the objects of my invention are to construct a tank that will create its own draft by the action of the heat and without the use of a tall stack; also, to construct a tank that will be easily managed and inexpensive to build. I attain these objects by the mechanism illustrated by the accompanying drawings, in which—

Figure 1 is a perspective view of a tank complete, as in use. Fig. 2 is a detail, partly in section, of the hot-air charging mechanism at the gas-feeding end of the fire-box. Fig. 3 is a top plan view showing one-half of the tank with the top removed, exposing one of the glass-melting chambers and the fire-box. Fig. 4 is a perspective view of one end of a tank cut through the center longitudinally to the middle of the tank, then cut out to the side, removing one-quarter of the tank and exposing the interior construction. Fig. 5 is a plan of the bottom of a tank as if the tank was turned upside down, and Fig. 6 is a cross-section of a tank cut through at its center crosswise.

Similar letters refer to similar parts throughout the several views.

The side walls A A are made of fire-brick or other suitable material, having an arched covering forming the top and two ends, reduced in thickness, forming the fire-boxes. The side walls are each provided with a large opening B and a number of small openings C. The large openings B lead to a tunnel D, which extends from wall to wall crosswise of and directly in the center of the tank. The tunnel D opens into and crosses the main tunnel E, which runs lengthwise of and directly through the center of the tank and below the tank bottom. (Most clearly shown in Figs. 4, 5, and 6.) The bottom I is placed about midway between the top of the tank and the ground and it is supported by numerous rows of fire-brick, forming walls F, and the said walls are set a few inches apart and run crosswise of the tank, leaving air-openings F' and passages from the outer opening C to the main tunnel, all as shown in Fig. 4.

The tank is divided into two melting-rooms, one being used for feeding the tank and the other for gathering. These rooms are divided by a partition G, which serves as an arch for the top and a support for the air-stack H. This partition rests on the furnace bottom and is provided with an opening J up through it leading from the tunnels E and D up through the stack H. Just above the floor I this opening is enlarged at K in the arch G, so as to give the air a larger cooling-space to keep the said arch from becoming too hot and melting. Just above this enlarged space an air-opening L extends through the entire arch and sides of the tank, as shown in Fig. 4. This opening serves to lead air into stack H J from the outside, serving to cool the central part of the arch G, and particularly that part which comes directly above the passages G', through which the molten glass runs when the tank is in operation. The opening L crosses and enters the main stack-opening J, all as shown in Fig. 4. The air enters at all the openings C and B, keeping the bottom of the tank from melting. The bottom I extends through into the fire-box as far as the wall 3 at each end of the tank. (Most clearly shown in Fig. 4.)

The fire-boxes are divided crosswise by three openings 4, 5, and 6, which extend through the said boxes from side to side, as shown in Figs. 1 and 4, these openings admitting air and serving to keep all parts of the box at a proper temperature. Between each opening 4 and the melting-rooms is a wall M. This wall is provided with an incline opening M', through which all the flame or heat enters the melting-rooms. The gas-flames enter the fire-boxes at small openings N, passing over the wall N', over the incline N'', down into and through the opening M', striking down on the glass, all as shown and indicated by the dotted lines and arrows in Fig. 4.

The wall 2 is the end wall of the fire-box, and the wall 1 being set out to form an air-space for feeding the air from the under side of the furnace to the opening N in case the furnace becomes too hot, this change in the air movement being effected by closing the damper O at the opening between the walls 2 and 3, as indicated by arrows and shown in Fig. 4.

Above the melting-furnaces a number of small flues P are placed for carrying off the surplus heat. These may be arranged in any number and size, as found necessary, but the number shown in my drawings I have found sufficient.

Parallel with the top of the furnace is laid a hot-draft flue Q, having fresh-air charging inlets Q' and a short stack Q'', all as shown in Figs. 1, 2, 3, and 4. An opening is made into the stack and flue through the top of the furnace, so that the heat may pass up through the stack Q'' or into the opening Q''' in the flue-back to the gas inlets or holes N, all as indicated in Figs. 2 and 4. The lower end of the flue Q is made in an inverted T shape, extending down near the gas-inlets at the ends of the fire-box and extending each way from the center, so as to distribute the heated air all along the gas-inlets N. (Most clearly shown in Fig. 2.)

A damper R is placed in the downward-extending end of each flue, so that it may be closed, shutting off the hot air from the gas-inlets. The branches Q' will charge the hot air with fresh oxygen when the damper is open, so that it will greatly increase the heat in the fire-box when these air-flues are operating.

The operation of my tank is as follows: The melting-room over which the smaller number of flues are made is filled with a sufficient quantity of the sand and compound to make glass. This compound is fed through the holes S on each side of the tank. Gas is turned on at the valve V. The hot-air dampers R are opened and dampers O turned down, leaving the air to enter the fire-box up between the walls 2 and 3. The heat at once accumulates in the fire-boxes and melting-rooms, and at the same time a portion of it is escaping at all the small stacks P and a portion is being drawn back through the hot-air flues Q and again fed into the fire-boxes. In drawing the heated air back through the flue it receives a small amount of cold or pure air through the small holes in the branches Q', thereby giving the air fresh oxygen to increase the flame and assist the gas in burning If the glass and tank should become too hot, the dampers O and R may be closed, so that nothing but cold air will be fed into the fire-boxes up from between the walls 1 and 2, thus feeding cold air to the fire-box, reducing the heat, the amount of gas fed into the furnace being also reduced and regulated by the valve V.

Having thus described my invention, I claim the following, and desire to secure the same by Letters Patent—

1. The combination in a glass melting tank of fire boxes arranged at opposite ends of the tank, heating chambers communicating with each other and with the fire boxes, air passages extending under the heating chambers and fire boxes, and an outlet stack for the air passages located between the heating chambers, substantially as described.

2. In a glass melting tank, the combination with the fire box and heating chamber, of horizontal gas inlets leading into the fire box opposite the heating chamber, vertical air passages arranged in the path of the gas inlets, a return flue leading from the melting chamber to the fire box having a downwardly extending portion terminating at a point above and adjacent the gas inlets and in line with one of the vertical air passages and a passage opposite the gas inlets leading into the heating chamber, substantially as described.

3. A glass melting tank having the melting chambers divided by an arched partition, a stack extending up over and above the said arch, tunnels under the melting chambers an opening extending up from the tunnels through the arch and stack, and a horizontal opening L, extending through the said tank crosswise and communicating with the stack opening, all as shown and described.

4. In a glass melting tank, the combination with the fire box and heating chamber, of a tunnel under the tank, air passages leading into the tunnel, a vertical air outlet stack at one end of the tunnel beyond the heating chamber, and passages at the opposite end of the tunnel leading to the fire box, substantially as described.

In testimony whereof I affix my signature in presence of two witnesses.

THOMAS PATRICK KENNEY.

Witnesses:
JOHN W. PITTENGER,
E. P. SMITH.